US012457203B2

(12) United States Patent
Singh et al.

(10) Patent No.: US 12,457,203 B2
(45) Date of Patent: Oct. 28, 2025

(54) ARTIFICIAL INTELLIGENCE (AI) BASED SECURE NETWORK PROTOCOLS WITH DYNAMIC MULTILAYER ENCRYPTION

(71) Applicant: Bank of America Corporation, Charlotte, NC (US)

(72) Inventors: Shailendra Singh, Maharashtra (IN); Saurabh Gupta, New Delhi (IN); Shreya Manocha, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 108 days.

(21) Appl. No.: 18/602,102

(22) Filed: Mar. 12, 2024

(65) Prior Publication Data
US 2025/0294013 A1    Sep. 18, 2025

(51) Int. Cl.
*H04L 29/06* (2006.01)
*H04L 9/40* (2022.01)

(52) U.S. Cl.
CPC ........ *H04L 63/0428* (2013.01); *H04L 63/105* (2013.01)

(58) Field of Classification Search
CPC .................... H04L 63/105; H04L 63/0428
See application file for complete search history.

(56) References Cited

U.S. PATENT DOCUMENTS

| 7,039,221 | B1 | 5/2006 | Tumey et al. | |
|---|---|---|---|---|
| 9,754,311 | B2 | 9/2017 | Eisen | |
| 10,516,652 | B1* | 12/2019 | Hashmi | H04L 63/061 |
| 11,025,688 | B1* | 6/2021 | Ijjurouthu | G06F 16/27 |
| 12,401,660 | B2* | 8/2025 | Binotto | G06F 21/6218 |
| 2005/0078828 | A1* | 4/2005 | Zheng | H04W 8/245 380/270 |
| 2006/0281471 | A1* | 12/2006 | Shaffer | H04W 48/18 455/456.2 |
| 2012/0084564 | A1* | 4/2012 | Choi | H04W 12/50 713/168 |
| 2021/0281442 | A1* | 9/2021 | Ray | H04L 12/4641 |

* cited by examiner

*Primary Examiner* — Vance M Little
(74) *Attorney, Agent, or Firm* — Weiss & Arons LLP

(57) ABSTRACT

Systems, methods, and apparatus are provided for AI-based generation of a secure network path and corresponding encryption protocols. AI algorithms may detect network nodes for data transfer from an origin point to a destination point. The nodes may be located in different countries. Nodes may be selected based on security levels and regulatory profiles generated for each node. AI algorithms may analyze the transfer data and output encryption algorithms for generating synthetic data from the transfer data. The encryption algorithms may be mapped to the nodes based on security levels and regulatory profiles associated with the nodes. A node may receive the transfer data and apply the mapped encryption algorithm. Successive nodes may iteratively encrypt the transfer data. A data packet header may include an identifier for each encryption algorithm applied to the transfer data.

21 Claims, 6 Drawing Sheets

ARTIFICIAL INTELLIGENCE (AI) BASED SECURE NETWORK PROTOCOLS WITH DYNAMIC MULTILAYER ENCRYPTION

FIELD OF TECHNOLOGY

Aspects of the disclosure relate to using AI to dynamically implement secure network protocols.

BACKGROUND OF THE DISCLOSURE

Enterprise data storage systems may be secured with firewalls and other security measures. However, in the course of a transfer outside enterprise systems, the data may be vulnerable. For example, the data may be susceptible to a bad actor attempting unauthorized access while the data is outside enterprise systems. A cross-border transfer may carry an even higher risk, as different countries may implement different network security standards and protocols.

Cross-border transfers may also face different regulatory requirements. Regulations in the origin country or the destination country may restrict the locations of network nodes associated with the transfer.

It would be desirable to determine the most secure path for transfer data that is moving from an origin location to a destination location. It would be desirable to use artificial intelligence to identify a set of nodes for the transfer and dynamically determine a level of encryption for each node based on the sensitivity of the data, the geographic location of various network nodes, the regulatory requirements associated with the geographic locations, the security level of the network nodes, and any other relevant factors.

It would be desirable to use AI to develop content-based modes of encryption for the data for cumulative application at the various nodes.

SUMMARY OF THE DISCLOSURE

Systems, methods, and apparatus are provided for AI-based generation of a secure network path and corresponding encryption protocols.

A first AI engine may receive input of transfer data, an origin point for the transfer data, and a destination point for the transfer data. The first AI engine may detect network nodes configured to transfer the data from the origin point to the destination point.

The first AI engine may generate a security level for a detected network node. The security level may be based at least in part on node history and existing node security protocols. The first AI engine may generate a regulatory profile for a detected network node. The regulatory profile may be based at least in part on node geolocation. The first AI engine may output a set of network nodes. Each node in the set of network nodes may be selected based at least in part on its security level and regulatory profile.

A second AI engine may analyze the transfer data. Based on the type of transfer data, the second AI engine may output an encryption algorithm configured to generate synthetic data from the data packet. The second AI engine may map the encryption algorithm to a node in the set of network nodes. The mapping may be based at least in part on a security level and regulatory profile associated with the node.

A node in the set of network nodes may receive the data packet and apply the encryption algorithm that was mapped to the node. A successive node in the set of network nodes may receive an encrypted data packet from a prior node and apply the encryption algorithm mapped to the successive node.

A data packet header may include an identifier for each encryption algorithm applied to the transfer data. The data packet header may also include node information such as IP address and geolocation. The mapped encryption algorithms and associated identifiers may be transmitted to the destination point. At the destination point, the successive layers of encryption may be decrypted to restore the original transfer data.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
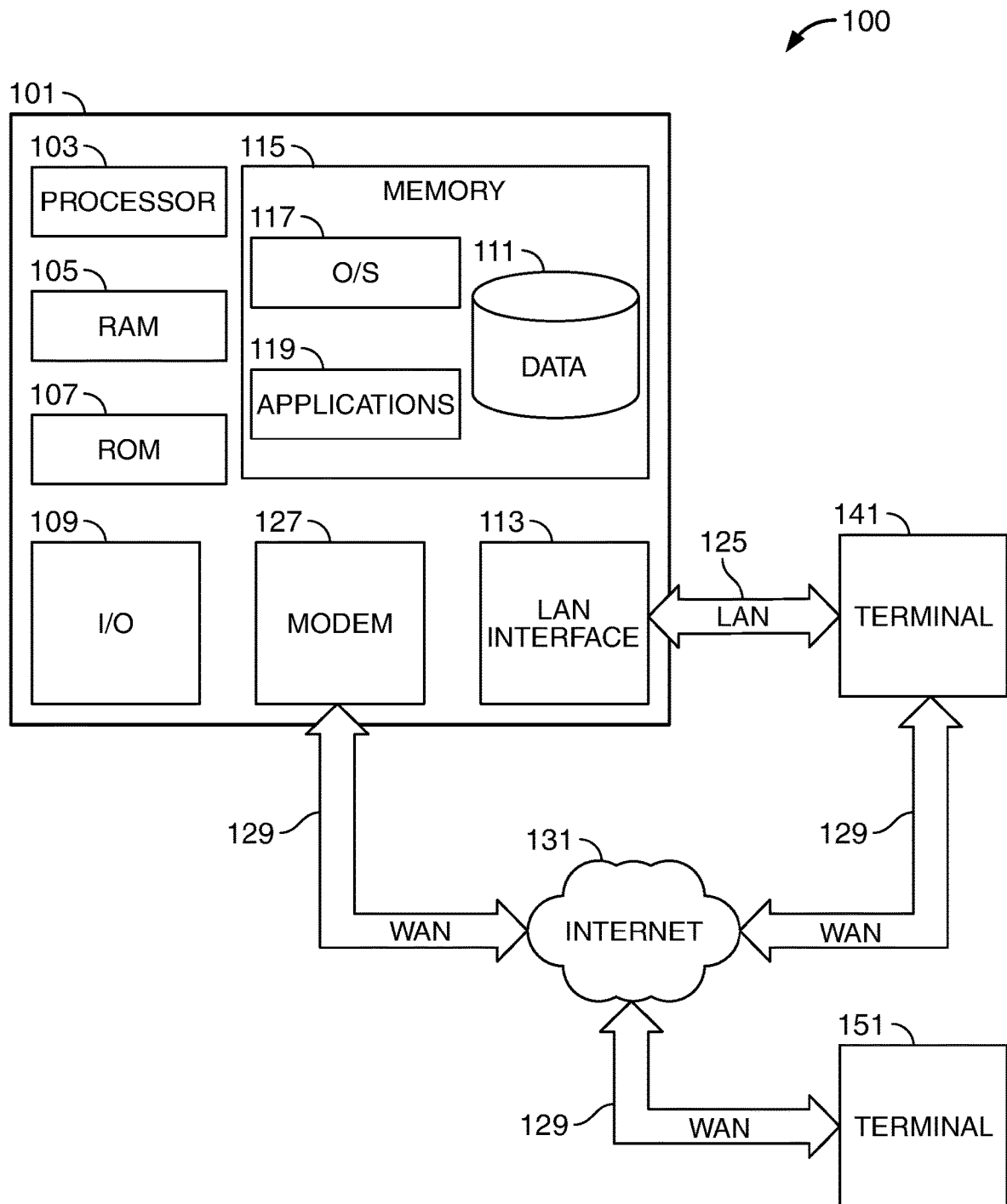
FIG. 1 shows illustrative apparatus in accordance with principles of the disclosure.

Systems, methods, and apparatus are provided for AI-based generation of a secure network path and corresponding encryption protocols.

For the sake of illustration, the invention will be described as being performed by a "system." The system may include one or more features of apparatus and methods that are described herein and/or any other suitable device or approach.

The system may include an origin point for a transaction. The origin point may be associated with a financial institution. The origin point may be the origin point for multiple associated transactions.

The system may include a destination point for the transaction. The destination point may be associated with a financial institution. The destination point and the origin point may be associated with the same financial institution. The destination point and the origin point may be associated with different financial institutions. The destination point may be the destination point for multiple associated transactions.

The system may include a transfer network. The system may include multiple transfer networks. The transfer networks may include multiple network nodes. The network nodes may be maintained in geographic regions. The network nodes may be maintained in different countries. Digital data from the origin point may be broken up and packaged into data packets. The data packets may be transmitted through multiple network nodes to the destination point.

The system may include one or more artificial intelligence (AI) engines. Each AI engine may include one or more artificial intelligence and/or machine learning algorithms.

The system may include a first AI engine. The first AI engine may determine a security level for the data. In some embodiments, the first AI engine may determine a separate security level for each individual data packet or group of data packets.

The first AI engine may determine a sensitivity level for the transfer data. The security level for the transfer data may be based on its sensitivity level. In some embodiments, the first AI engine may determine a separate sensitivity level for each individual data packet or group of data packets.

The first AI engine may identify a set of network nodes available for the transfer. The first AI engine may determine a geographic location for each of the network nodes. The first AI engine may record geolocation coordinates for each node.

The first AI engine may determine a security level for each network node. The security level may be based on the geographic location of the node. The security level may be based on the local network associated with the node. The security level may be based on historical events associated with the node, the network, and/or the geographic location. The security level may be based on current events associated with the geographic location.

The first AI engine may determine a regulatory profile for the node. The regulatory profile may be based on the geographic location of the node. The regulatory profile may be based on requirements associated with the country of the origin point and/or the destination point. The regulatory profile may be based on requirements associated with a financial institution at the origin point and/or a financial institution at the destination point.

The first AI engine may select a set of nodes that define a path for transfer data from the origin point to the destination point. The set of nodes may be selected based on the security level of the nodes. The set of nodes may be selected based on the regulatory profile of the nodes. The set of nodes may be selected based on a combination of security levels, regulatory profiles, and any other suitable factors. In some embodiments, the system may randomly select a smaller group of transfer nodes from within the set of nodes.

The first AI engine may determine encryption protocols for the set of nodes. The encryption protocols may be based on the security profiles of the nodes. The encryption protocols may be based on the regulatory profiles of the nodes. In some embodiments, the same encryption protocols may be applied at all the nodes. In some embodiments, different encryption protocols may be applied at different nodes. In some embodiments, encryption protocols may be applied at a portion of the nodes. The encryption protocols may include algorithms that are customized for the content of the transfer data.

In some embodiments, the data may be encrypted prior to transfer. In some embodiments, the data may be iteratively encrypted at one or more nodes on the transfer path.

In some embodiments, the data may be iteratively encrypted at each node in the transfer path for multiple layers of encryption. Each node may receive encrypted data and apply an additional layer of encryption. The layers of encryption may use different algorithms. Information about a node, including geolocation coordinates, IP address, and/or an encryption algorithm identifier, may be encoded in a header associated with the data packet.

The system may include a second AI engine. The second AI engine may determine a suitable encryption algorithm based on the content of the transfer data or the content of an individual data packet. The second AI engine may include a pattern analysis algorithm, a correlation analysis algorithm, a statistical analysis algorithm, and/or any other suitable algorithm.

The second AI engine may identify characteristics of the transfer data. The characteristics may be associated with the data structure. Based on the characteristics, the AI engine may select a mathematical algorithm for generating synthetic data from the transfer data. In some embodiments, the second AI engine may select a different algorithm for generating synthetic data to be applied at each node. In some embodiments, an individual node may include AI capable of selecting an algorithm to generate the synthetic data.

In some embodiments, the system may include key pair encryption. The system may use symmetric key encryption. The system may use asymmetric key encryption with a public/private key infrastructure. The key pair encryption may be applied based on the security profile of a node.

The system may apply key pair encryption in addition to the AI algorithm encryption. An encryption key may be applied to the synthetic transfer data generated by the second AI engine. In some embodiments, the encryption key may be applied at the origin point prior to transfer. In some embodiments, an encryption key may be applied at one or more nodes on the transfer path. In some embodiments, a different encryption key may be applied at each node in the transfer path.

The system may transmit AI algorithm and/or key pair data to the destination point. The AI algorithm and/or key pair data may be transmitted by an origin point financial institution, by an AI engine, or by any suitable system components. A destination point financial institution may apply successive layers of decryption to restore the transfer data.

One or more non-transitory computer-readable media storing computer-executable instructions are provided. When executed by a processor on a computer system, the instructions may perform a method for AI-based generation of a secure network path and dynamic encryption protocols.

The method may include receiving an input of a data packet, an origin point for the data packet, and a destination point for the data packet. The method may include, using one or more artificial intelligence algorithms, detecting network nodes configured to transfer the data packet from the origin point to the destination point.

The method may include, using one or more artificial intelligence algorithms, determining a security level for a detected network node, the security level based on at least in part on node history and existing node security protocols.

The method may include, using one or more artificial intelligence algorithms, determining a regulatory profile for a detected network node, the regulatory profile based at least in part on node geolocation.

The method may include, using one or more artificial intelligence algorithms, outputting a set of network nodes, each node in the set of network nodes selected based at least in part on its security level and regulatory profile.

The method may include analyzing the data packet using one or more artificial intelligence algorithms and based on a characteristic of the data packet, outputting an encryption algorithm configured to generate synthetic data from the data packet.

The method may include, using one or more artificial intelligence algorithms, mapping the encryption algorithm to one of the nodes in the set of network nodes, the mapping based at least in part on a security level and regulatory profile associated with the node.

The method may include, at a node in the set of network nodes, receiving the data packet and applying an encryption algorithm that was mapped to the node.

The method may include, at a successive node in the set of network nodes, receiving a data packet previously encrypted at a prior node. The successive node may apply an encryption algorithm that was mapped to the successive node.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCS, minicomputers, mainframe computers, distributed computing environments that include any of the above systems or devices, and the like.

Figure 2:
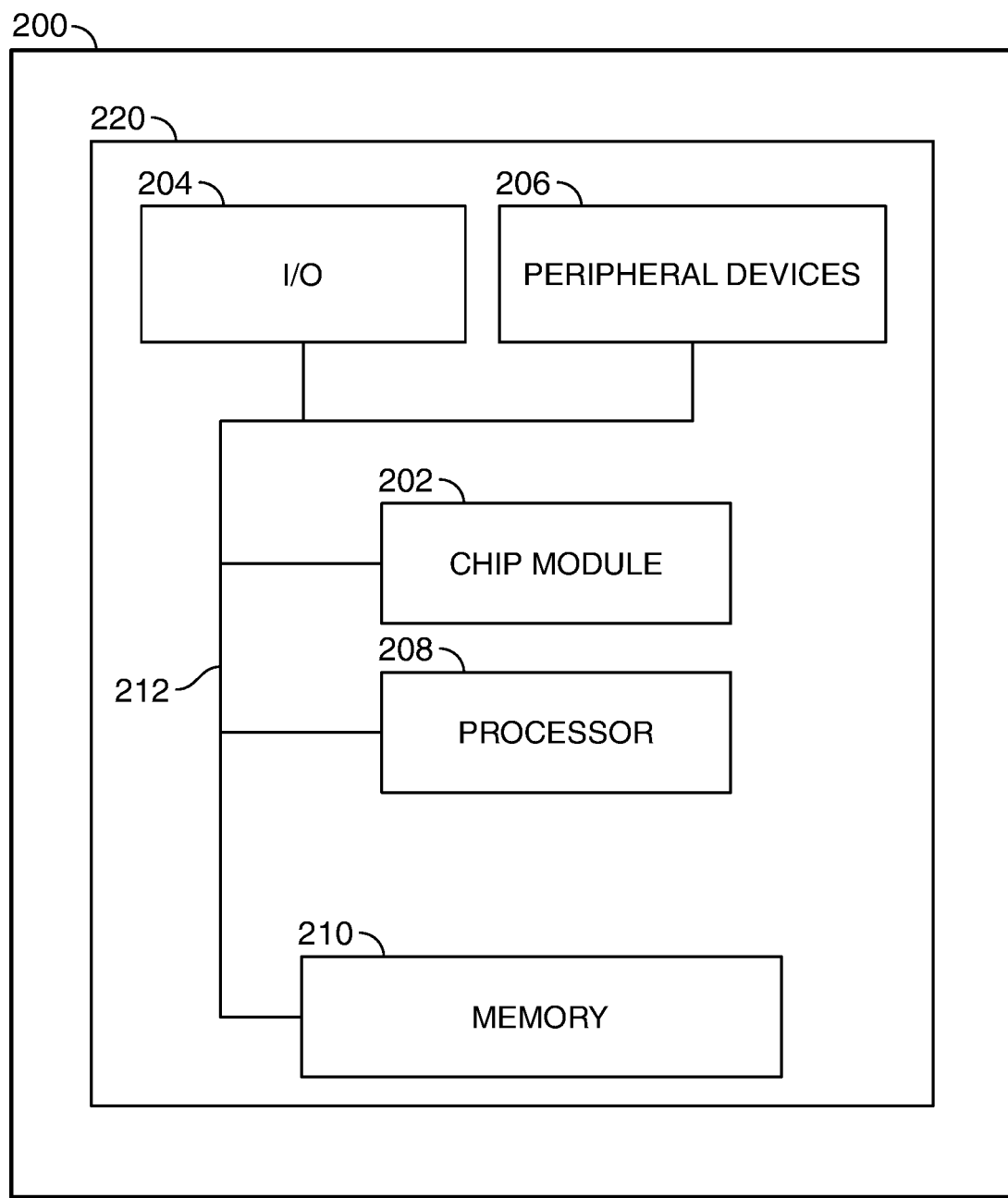
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
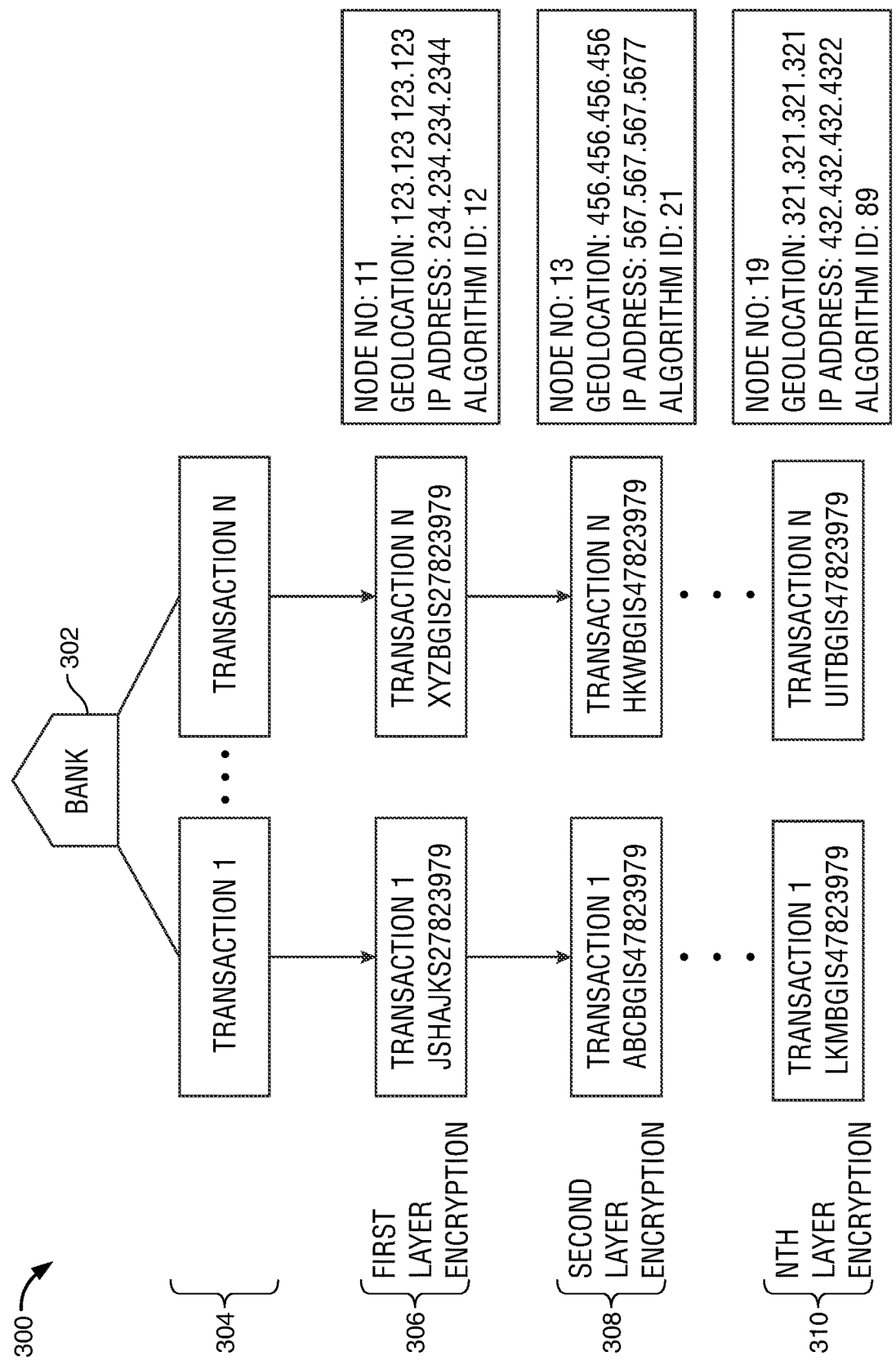
FIG. 3 shows an illustrative process flow in accordance with principles of the disclosure.

FIG. 3 shows illustrative process flow 300 for multilayer encryption protocols. Bank 302 may be an origin point for a group of transactions. At 304, the transactions may include transactions 1-N.

At 306, the transaction data for each transaction may be transmitted to a first node. The first node may apply a first encryption algorithm. A data packet header may include an identifier for the first node. The data packet header may include geolocation coordinates for the first node. The data packet header may include an internet protocol (IP) address for the first node. The data packet header may include an algorithm identifier for the encryption algorithm used at the first node. The encryption algorithm may be selected based on the content of the data. The encryption algorithm may be selected based on the security level and/or regulatory profile of the node. FIG. 3 shows illustrative header data, but any suitable information may be encoded in the data packet header.

At 308, the transaction data for each transaction may be transmitted to a second node. The second node may apply a second encryption algorithm to previously encrypted data received from a previous node. A data packet header may include an identifier for the second node. The data packet header may include geolocation coordinates for the second node. The data packet header may include an IP address for the second node. The data packet header may include an algorithm identifier for the encryption algorithm used at the second node.

At 310, the transaction data for each transaction may be transmitted to an Nth node. The Nth node may apply an Nth encryption algorithm to previously encrypted data received from a previous node. A data packet header may include an identifier for the Nth node. The data packet header may include geolocation coordinates for the Nth node. The data packet header may include an IP address for the Nth node. The data packet header may include an algorithm identifier for the encryption algorithm used at the Nth node.

Figure 4:
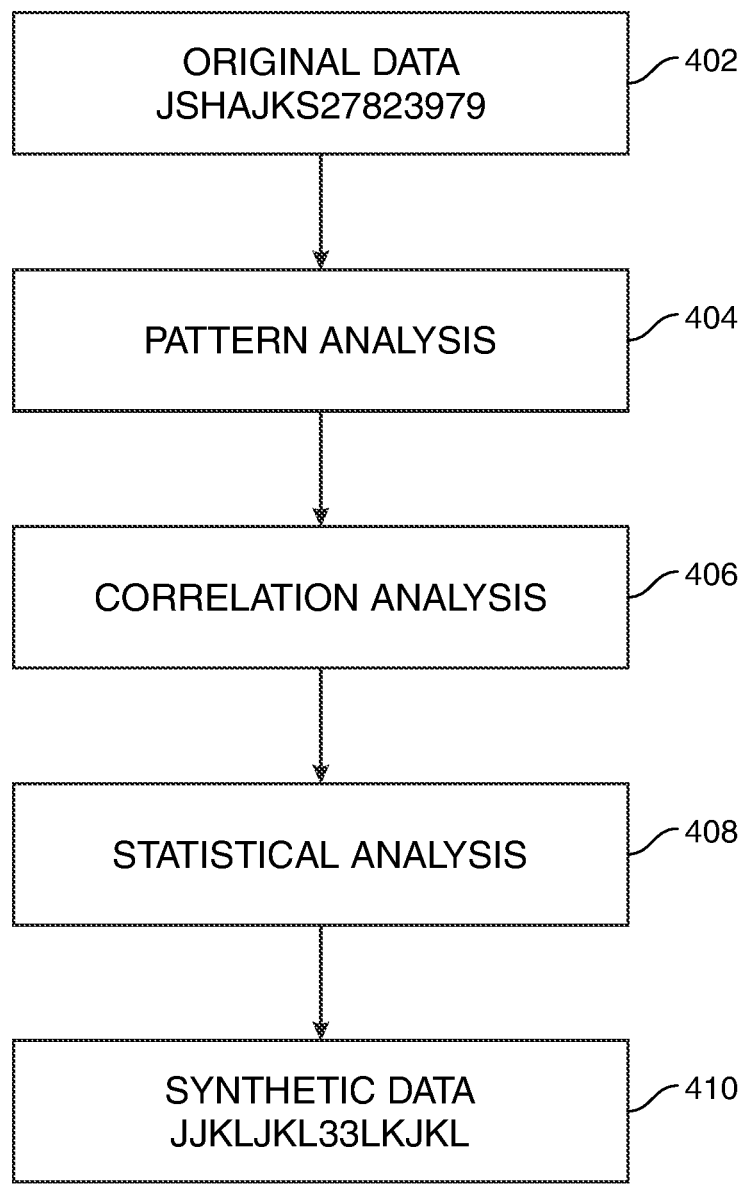
FIG. 4 shows an illustrative process flow in accordance with principles of the disclosure.

FIG. 4 shows illustrative process flow 400 for using an AI engine to generate a data-specific encryption algorithm. The algorithm may generate synthetic data from the transfer data. The synthetic data may be based on one or more characteristics of the transfer data.

At 402, the AI engine may receive the original data. At 404 the AI engine may apply one or more pattern recognition algorithms. At 406, the AI engine may apply one or more correlation analysis algorithms. At 408, the AI engine may apply one or more statistical analysis algorithms. At 410, the AI engine may output an encryption algorithm that generates synthetic data from the original data. The encryption algorithm may be based on data structure identified by the AI analysis.

Figure 5:
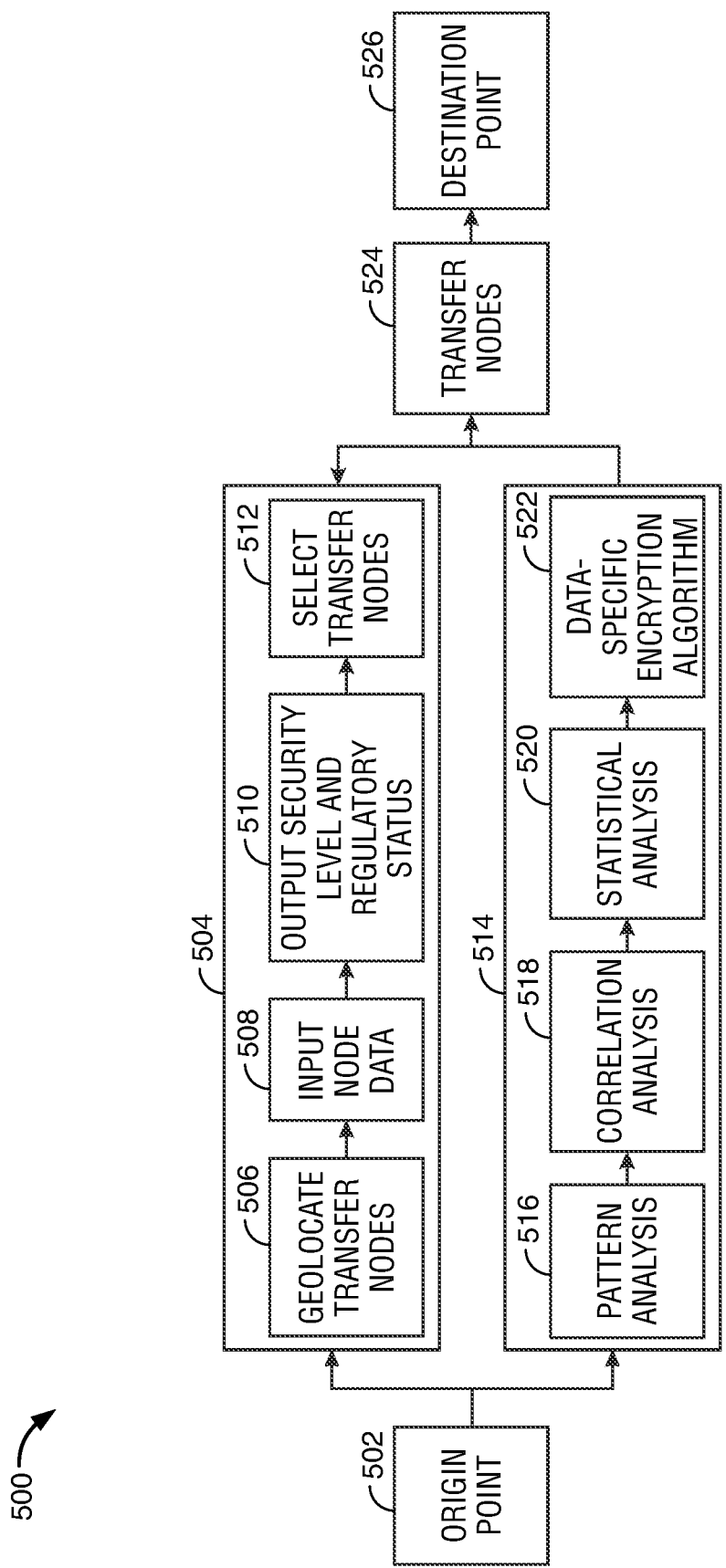
FIG. 5 shows an illustrative process flow in accordance with principles of the disclosure.

FIG. 5 illustrative shows process flow 500 for generating an AI-based secure network path and path-specific multilayer encryption protocols. At 502, the origin point may generate transaction data.

The system may include a first AI engine 504. At 506, AI engine 504 may geolocate network nodes that may be used to transfer data from origin point 502 to destination point 526. In some embodiments, AI engine 504 may receive geolocation data from the transfer network or any suitable data source.

At 508, the engine may receive an input of data associated with the nodes. The data may be received from the transfer network, an origin point financial institution, a destination point financial institution, a regulatory authority, a news feed, or any suitable source. The data may include a history of node security incidents. The data may include node security protocols. The data may include regulations associated with the node location. The data may include regulations associated with the node location, the origin point location, and/or the destination point location. At 510, AI engine 504 may output a security level and a regulatory status for the nodes. At 512, AI engine 504 may output a set of selected network nodes.

The system may include a second AI engine 514. At 516, AI engine 514 may apply a pattern analysis algorithm to the transfer data. At 518, AI engine 514 may apply a correlation analysis algorithm to the transfer data. At 520, AI engine 514 may apply a statistical analysis algorithm to the transfer data. At 522, the system may output a data-specific encryption algorithm for generating synthetic data from the transfer data.

At 524, the system may transmit data-specific encryption algorithms to the transfer nodes. The encryption algorithms may be customized to the security levels and regulatory profiles for the nodes. At 526, the data may be transmitted to the destination point. The destination point may decrypt the data.

Figure 6:
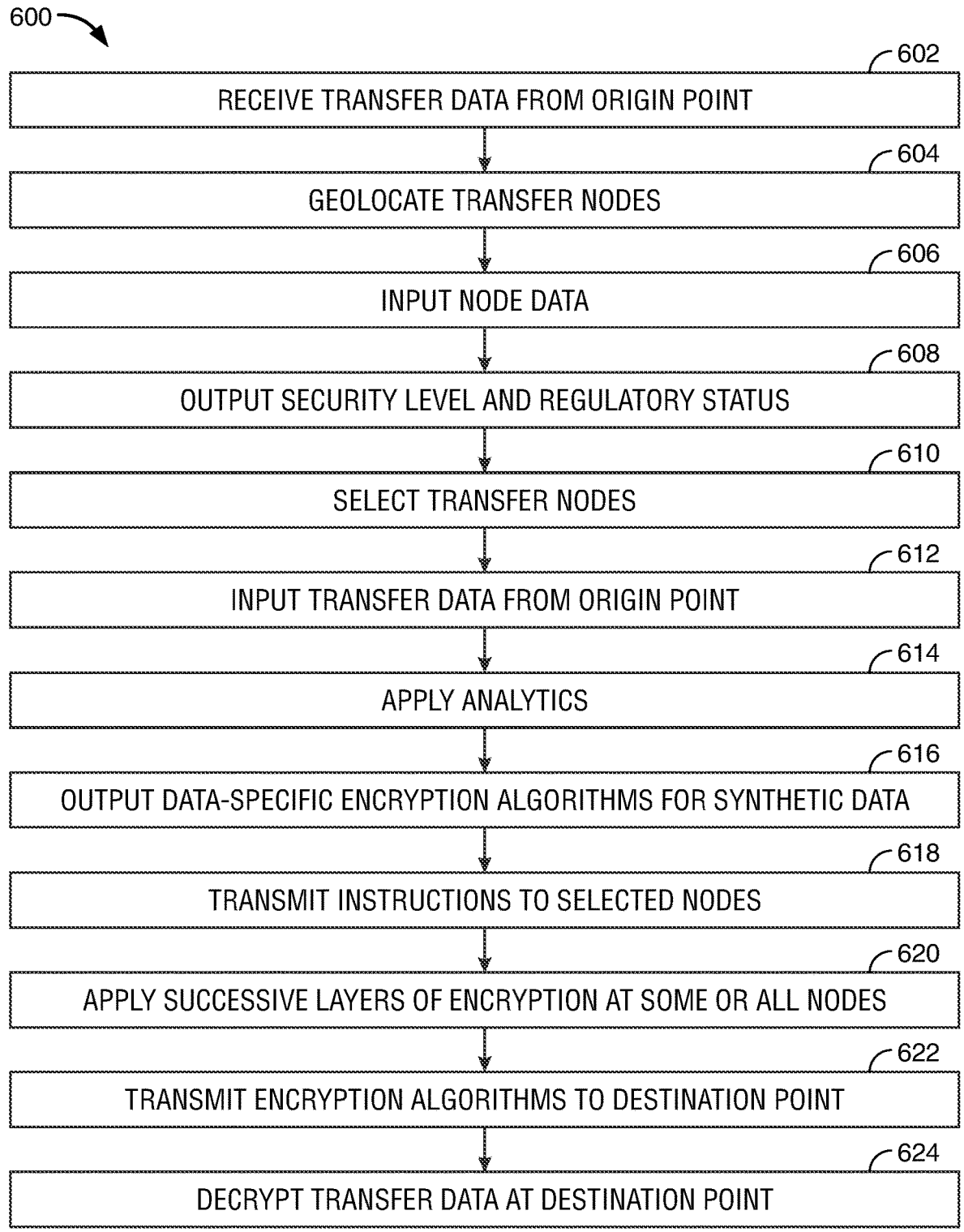
FIG. 6 shows an illustrative process flow in accordance with principles of the disclosure.

FIG. 6 shows illustrative process flow 600 for generating an AI-based secure network path and path-specific multilayer encryption protocols.

At 602, the transfer data may be received from the origin point. The origin point may be a financial institution. At 604, network nodes may be geolocated.

At 606, node data may be input to an AI engine. Node data may include node geolocation data, node security history, node security protocols, regulatory requirements associated with a node location, and/or any suitable data. Input data may also include regulatory requirements associated with an origin point and/or destination point, a sensitivity level of the data and/or any suitable data. In some embodiments, the AI engine may determine the sensitivity level of the data based on its content, storage parameters, clearances, metadata, or any other suitable factors. At 608, the AI engine may use one or more AI/ML algorithms to generate a security level and regulatory status for the node. At 610, the AI engine may select network nodes for the transfer based on their security levels and regulatory status.

At 612, transfer data and metadata may be input to an AI engine. At 614, the AI engine may apply pattern analysis, correlation analysis, statistical analysis, and/or any suitable form of analysis. At 616, the AI engine may output data-specific encryption algorithms. The encryption algorithms may generate synthetic data with a structure similar to the input data. At 618 encryption instructions may be transmitted to the selected network nodes. The instructions for each node may be based on its individual security level and regulatory profile.

At 620, the transfer nodes may successively apply encryption to the transfer data according to the instructions. At 622, the encryption algorithms, algorithm identifiers, and/or associated decryption protocols may be transmitted to the destination point. At 624, the destination point may receive and decrypt the transfer data.

Thus, methods and apparatus for ARTIFICIAL INTELLIGENCE (AI) BASED SECURE NETWORK PROTOCOLS WITH DYNAMIC MULTILAYER ENCRYPTION are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for AI-based generation of a secure network path and dynamic encryption protocols, the method comprising:
    receiving input of a data packet, an origin point for the data packet, and a destination point for the data packet;
    using one or more artificial intelligence algorithms:
        detecting network nodes configured to transfer the data packet from the origin point to the destination point;
        generating a security level for a detected network node, the security level based on at least in part on node history;
        generating a regulatory profile for a detected network node, the regulatory profile based at least in part on node geolocation;
        outputting a set of network nodes, each node in the set of network nodes selected based at least in part on its security level and regulatory profile;
        based on a characteristic of the data packet, outputting an encryption algorithm configured to generate synthetic data from the data packet; and
        mapping the encryption algorithm to a node in the set of network nodes, the mapping based at least in part on a security level and regulatory profile associated with the node;
    at a first node in the set of network nodes, receiving the data packet and applying a first encryption algorithm mapped to the first node; and
    at a second node in the set of network nodes, receiving an encrypted data packet from the first node and applying a second encryption algorithm mapped to the second node.

2. The media of claim 1, wherein the security level for a detected network node is further based on an existing security protocol associated with the detected network node.

3. The media of claim 1, wherein a data packet header comprises an identifier for each encryption algorithm applied to the data packet.

4. The media of claim 3, the method further comprising transmitting an encryption algorithm mapped to a node and an identifier for the encryption algorithm to the destination point.

5. The media of claim 1, the method further comprising, based on the security level for the first node, applying key pair encryption to a data packet in addition to the first encryption algorithm.

6. The media of claim 1, wherein the same encryption algorithm is mapped to the first node and the second node.

7. The media of claim 1, wherein different encryption algorithms are mapped to the first node and the second node.

8. A system for AI-based generation of a secure network path and path-specific encryption protocols, the system comprising:
    a processor comprising one or more artificial intelligence algorithms configured to:
        receive input of a data packet, an origin point for the data packet, and a destination point for the data packet;
        geolocate a network node configured to transfer the data packet from the origin point to the destination point;
        determine a security level for a geolocated network node, the security level based on at least in part on node history;
        determine a regulatory profile for a geolocated network node, the regulatory profile based at least in part on node geolocation;
        output a set of network nodes, each node in the set of network nodes selected based at least in part on its security level and regulatory profile;
        based on a characteristic of the data packet, output an encryption algorithm configured to generate synthetic data from the data packet; and
        map the encryption algorithm to a node in the set of network nodes, the mapping based at least in part on a security level and regulatory profile associated with the node;
    a first node from the set of network nodes configured to encrypt the data packet using a first encryption algorithm mapped to the first node; and
    a second node from the set of network nodes configured to receive an encrypted data packet from the first node and encrypt the encrypted data packet using a second encryption algorithm mapped to the second node.

9. The system of claim 8, wherein the security level for a detected network node is further based on an existing security protocol associated with the geolocated network node.

10. The system of claim 8, wherein a data packet header comprises an identifier for each encryption algorithm applied to the data packet.

11. The system of claim 10, the processor further configured to transmit an encryption algorithm mapped to a node and an identifier for the encryption algorithm to the destination point.

12. The system of claim 8, the first node configured to encrypt the data packet using key pair encryption in addition to the first encryption algorithm.

13. The system of claim 8, wherein the same encryption algorithm is mapped to the first node and the second node.

14. The system of claim 8, wherein different encryption algorithms are mapped to the first node and the second node.

15. A method for AI-based generation of a secure network path and dynamic encryption protocols, the method comprising a processor comprising one or more artificial intelligence algorithms:
   receiving input of a data packet, an origin point for the data packet, and a destination point for the data packet;
   detecting network nodes configured to transfer the data packet from the origin point to the destination point;
   generating a security level for a detected network node, the security level based on at least in part on node history;
   generating a regulatory profile for a detected network node, the regulatory profile based at least in part on node geolocation;
   outputting a set of network nodes, each node in the set of network nodes selected based at least in part on its security level and regulatory profile;
   based on a characteristic of the data packet, outputting an encryption algorithm configured to generate synthetic data from the data packet; and
   mapping the encryption algorithm to a node in the set of network nodes, the mapping based at least in part on its security level and regulatory profile.

16. The method of claim 15, the method further comprising, at a first node in the set of network nodes, receiving the data packet and applying a first encryption algorithm mapped to the first node; and
   at a second node in the set of network nodes, receiving an encrypted data packet from the first node and applying an additional encryption algorithm mapped to the second node.

17. The method of claim 16, wherein the first node and the second node are located in different countries.

18. The method of claim 16, wherein a data packet header comprises an identifier for each encryption algorithm applied to the data packet.

19. The method of claim 18, the method further comprising transmitting an encryption algorithm mapped to a node and an identifier for the encryption algorithm to the destination point.

20. The method of claim 16, wherein the same encryption algorithm is mapped to the first node and the second node.

21. The method of claim 16, wherein different encryption algorithms are mapped to the first node and the second node.

* * * * *